United States Patent
Parrish et al.

(10) Patent No.: US 6,521,071 B2
(45) Date of Patent: Feb. 18, 2003

(54) TREAD APPLICATION APPARATUS WITH AUTOMATED TREAD CENTERING FEATURE

(75) Inventors: Gary Charles Parrish, Irving, TX (US); Ralph Michael Parise, Stow, OH (US); Gary Bernard Schumacher, Navarre, OH (US); Randy Ray Beller, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 96 days.

(21) Appl. No.: 09/897,296

(22) Filed: Jun. 29, 2001

(65) Prior Publication Data

US 2002/0170652 A1 Nov. 21, 2002

Related U.S. Application Data

(60) Provisional application No. 60/291,285, filed on May 17, 2001.

(51) Int. Cl.$^7$ ................................................ B29D 30/54
(52) U.S. Cl. ........................... 156/127; 156/64; 156/96; 156/406.2; 156/421.8
(58) Field of Search ........................... 156/96, 64, 123, 156/126, 127, 128.1–129, 406.2, 406.6, 421.8, 909; 425/17, 19, 29

(56) References Cited

U.S. PATENT DOCUMENTS

| | | | |
|---|---|---|---|
| 3,063,491 A | * 11/1962 | Mitchell | 156/127 |
| 3,815,651 A | 6/1974 | Neal | 152/187 |
| 3,976,532 A | 8/1976 | Barefoot | 156/405 |
| 4,036,677 A | 7/1977 | Marangoni | 156/394 |
| 4,080,230 A | 3/1978 | Batchelor et al. | 156/96 |
| 4,178,198 A | 12/1979 | Kent | 156/96 |
| 4,359,675 A | * 11/1982 | Miller, III | 425/29 |
| 4,957,574 A | 9/1990 | Clayton et al. | 156/126 |
| 4,957,575 A | 9/1990 | Cronin | 156/126 |
| 5,318,655 A | 6/1994 | Miyamoto et al. | 156/351 |
| 5,364,490 A | 11/1994 | Hilke et al. | 156/396 |
| 5,380,383 A | 1/1995 | Chlebina et al. | 156/96 |
| 5,389,187 A | 2/1995 | Marks et al. | 156/405.1 |
| 5,425,835 A | 6/1995 | Chlebina et al. | 156/406.2 |
| 5,486,260 A | 1/1996 | Garmy et al. | 156/406.2 |
| 5,551,619 A | 9/1996 | Narron | 226/17 |

FOREIGN PATENT DOCUMENTS

| | | |
|---|---|---|
| EP | 108723 | 5/1984 |
| GB | 812155 | 4/1959 |

* cited by examiner

Primary Examiner—Geoffrey L. Knable
(74) Attorney, Agent, or Firm—David L. King

(57) ABSTRACT

An improved method for applying an annular tread (10) to a pneumatic tire casing (20) which has the steps of mounting the tread (10) on a tread expander assembly (200) wherein the tread (10) pass over a mount wheel (300) prior to the casing (20) being mounted onto the mount wheel. The improved apparatus (100) has all the mechanisms for supporting the casing (20) and the tread (10) extended from one end (405) allowing the operator to work entirely in front of the apparatus.

4 Claims, 14 Drawing Sheets

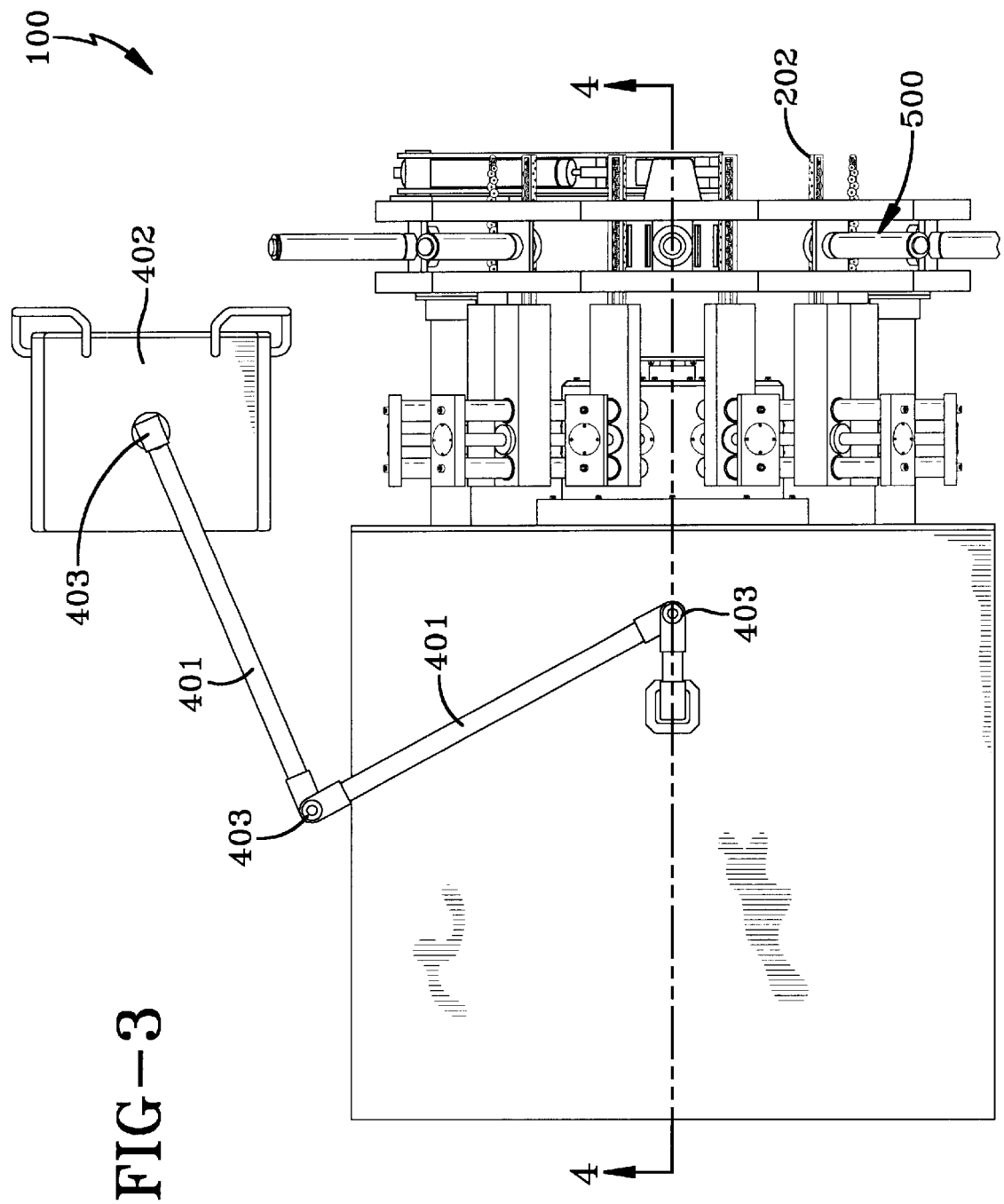

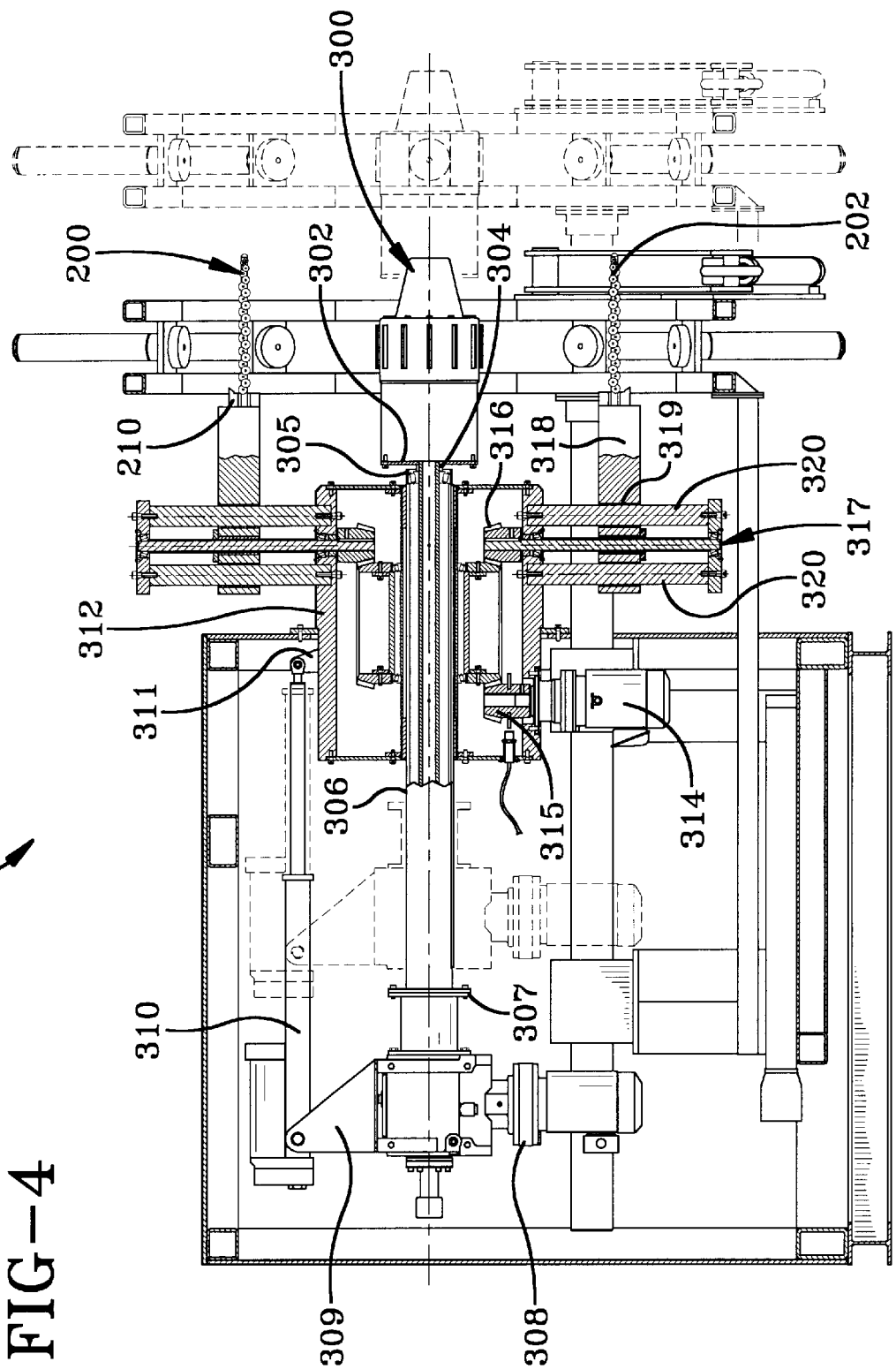

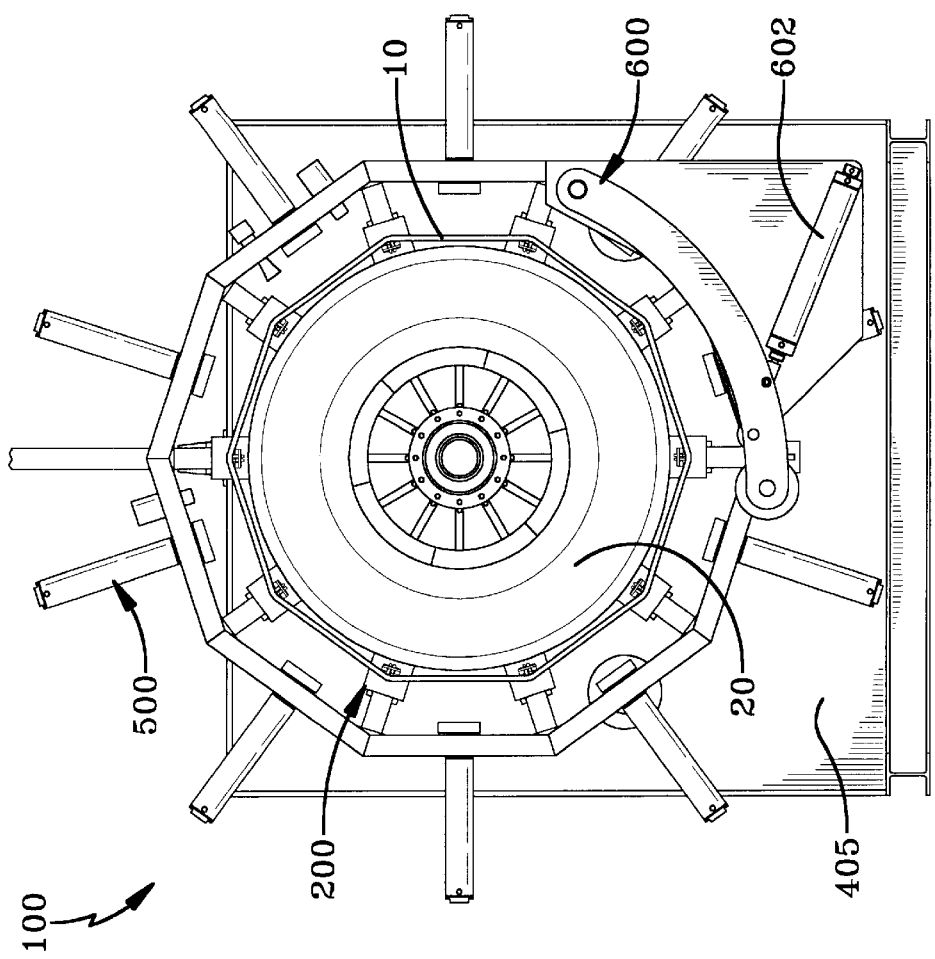
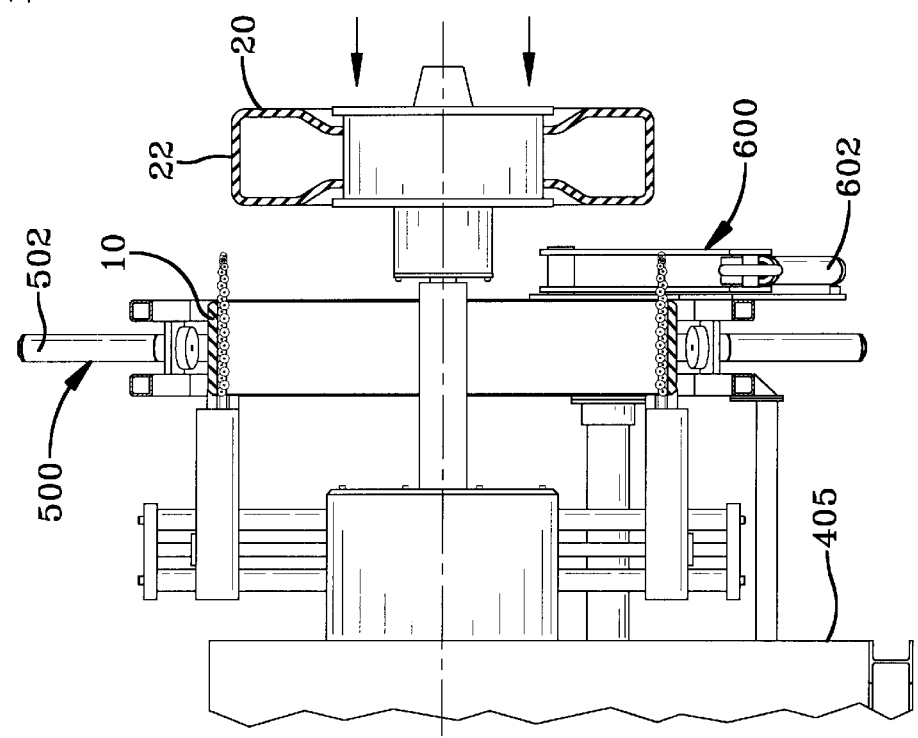

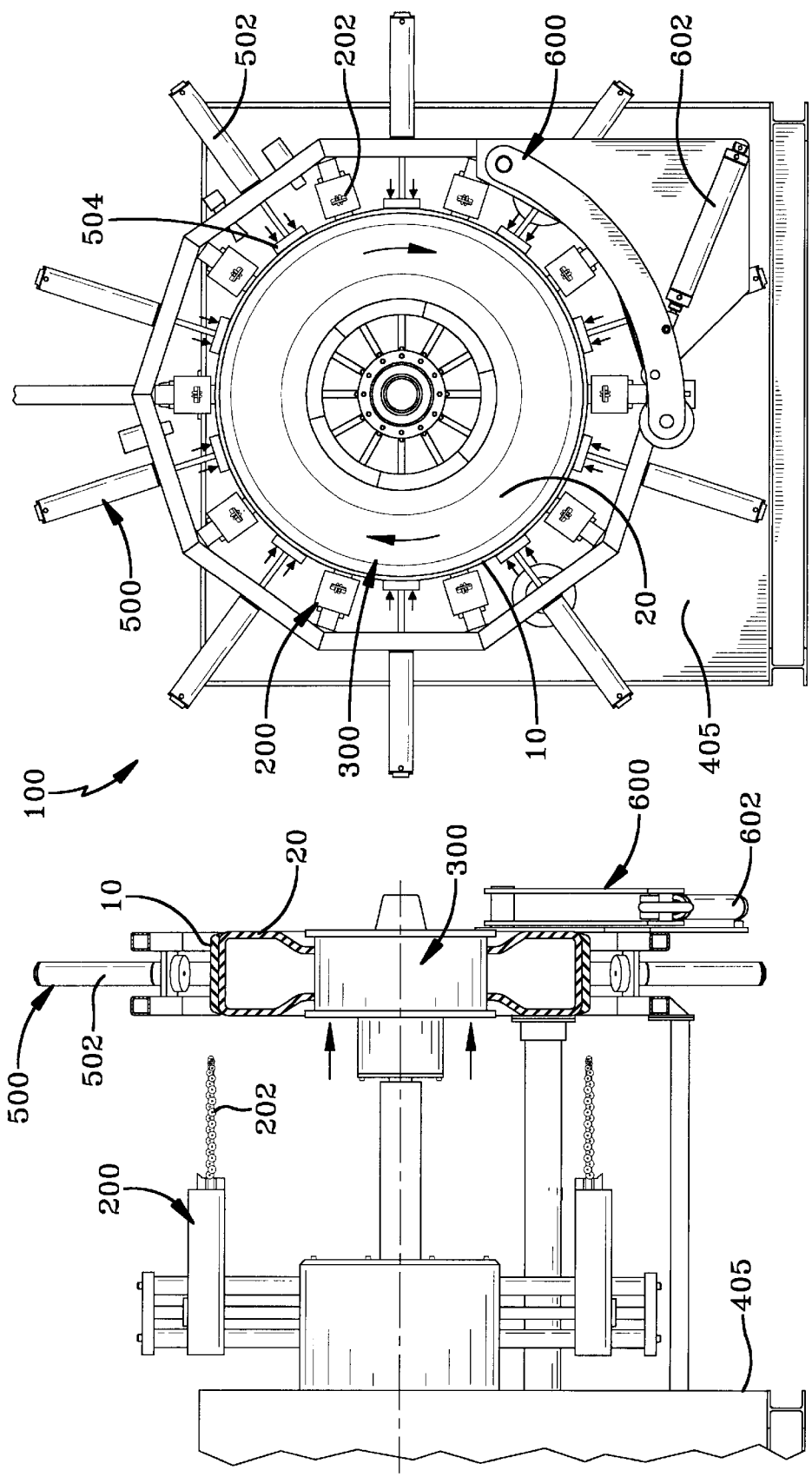

US 6,521,071 B2

TREAD APPLICATION APPARATUS WITH AUTOMATED TREAD CENTERING FEATURE

This application claims the benefit of U.S. Provisional Application No. 60/291,285, filed May 17, 2001.

TECHNICAL FIELD OF THE INVENTION

This present invention relates to an improved method of applying and centering an annular tread onto a pneumatic tire casing.

BACKGROUND OF THE INVENTION

In the practice of retreading tires, more specifically when applying an annular tread or ring tread onto a pneumatic tire casing, it is common practice to stretch the tread prior to positioning it over the casing.

In U.S. Pat. No. 4,957,574, issued Sep. 18, 1990, a tread centering method and apparatus is disclosed. In that patent a tread expander is shown having a plurality of radially expandable fingers that support the tread at several locations and when expanded stretch the tread a sufficient amount to allow the tread to encircle the casing to which the tread is about to be mounted. This device requires the operator to position himself between the wheel mount assembly and the tread expander when he places the tread onto the expander. This means the operator of the equipment must work at the side of the apparatus and must lean into the equipment while holding an annular tread weighing as much as 50 pounds to place it on the unit. To avoid this, the operator often suspends the tread on one of the tread expander fingers to support the tread weight and then he simply works the tread over the remaining support fingers. This greatly reduces the fatigue and potential injury factor, but it in no way improves the time to make the assembly.

It is an objective of the present invention to provide a tread application apparatus that permits the operator to perform all operations at one end of the machine.

It is a further object of the invention to provide a machine with a unique tread alignment capability.

It is still a further objective to minimize worker fatigue by enabling a simpler method of applying the tread and casing to the apparatus.

SUMMARY OF THE INVENTION

An improved method for applying an annular tread to a pneumatic tire casing has the steps of mounting the tread on a tread expander assembly wherein the tread passes over a mount wheel prior to the casing being mounted onto the mount wheel. The mount wheel is movable along a line coincident with or parallel to the axis of the tread expander assembly. The method has the casing mounted to the mount wheel while the mount wheel is extended outward of the tread expander assembly, the tread is radially expanded and the mounted casing is retracted with the tread encircling the casing, clamping the tread to the casing and transferring the tread onto the casing.

The preferred method further has the step of mounting the tread on the tread expander, including the steps of pushing the tread along a first edge of the tread to a fixed distance at each location of tread support, thereby aligning the annular tread parallel to the casing prior to expanding the tread over the casing.

The improved apparatus for practicing the above described method has a control cabinet structure wherein all the mechanisms for supporting the casing and tread are extended from one end allowing the operator to work entirely in front of the apparatus.

BRIEF DESCRIPTION OF THE DRAWINGS

The invention will be described by way of example and with reference to the accompanying drawings in which:

FIG. 3 is a top view of the apparatus of FIG. 1.

FIG. 4 is a cross-sectional view of the apparatus taken along lines 4—4 of FIG. 3.

FIG. 7 shows a casing mounted onto the mount wheel of the apparatus.

FIG. 8 is an end view of the apparatus showing the casing and tread mounted on the apparatus.

FIG. 11 shows the tread expander with the fingers retracted from between the tread and the casing.

FIG. 12 shows the clamping mechanism reclamping the tread at spaced locations.

DETAILED DESCRIPTION OF THE PREFERRED EMBODIMENTS

Figure 1:
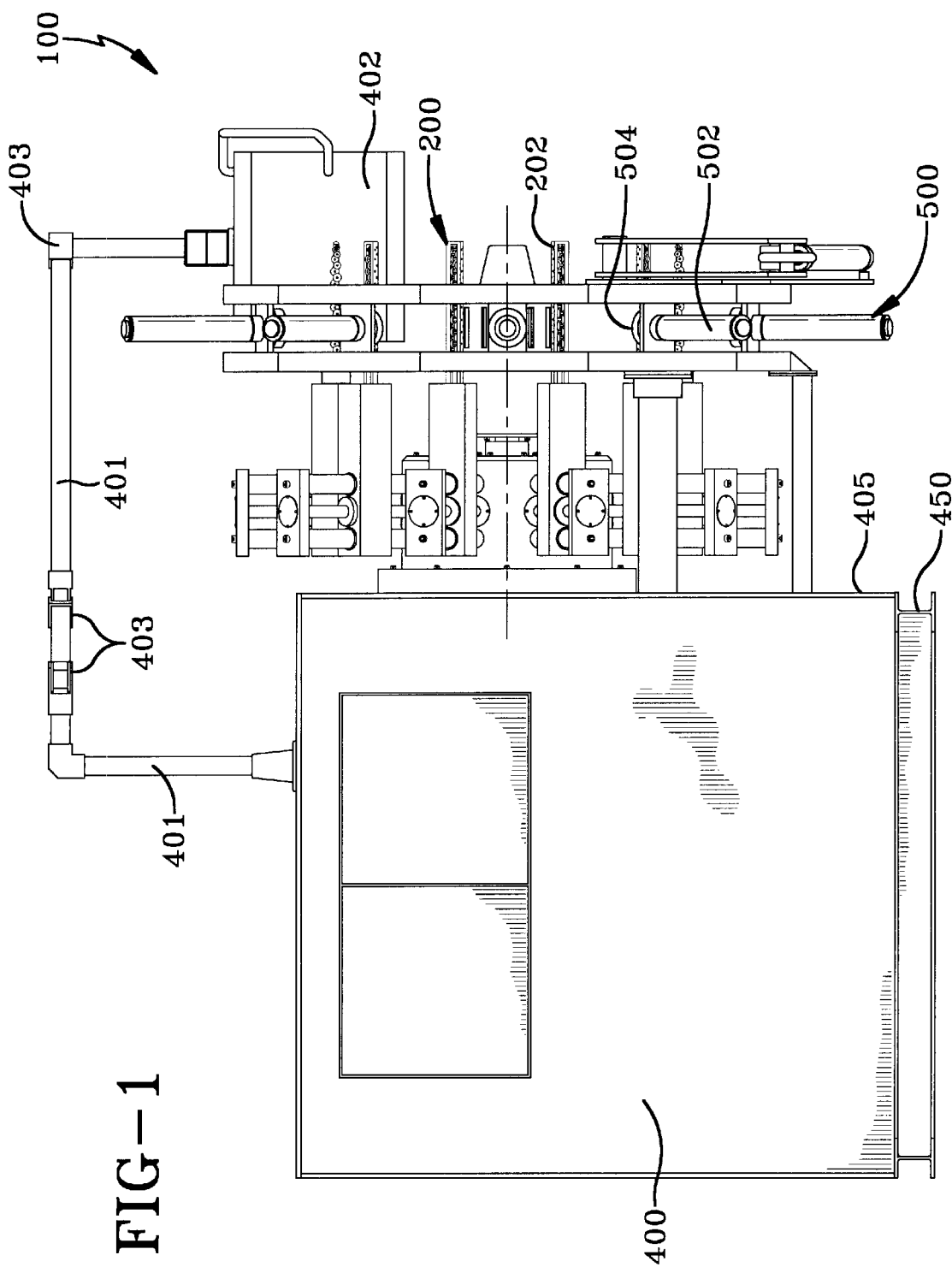
FIG. 1 is a plan view of the apparatus of the present invention.

A tread application apparatus (100) with automated tread centering feature is illustrated in FIGS. 1–14. As shown in FIG. 1, a large control cabinet is illustrated, the control cabinet structure (400) includes a base frame (450), which is preferably securely mounted to the floor. Extending from the top of the control cabinet is an electrical conduit (401) having pivotable joints (403). At the end of the conduit is a touch screen control monitor (402). From this control monitor (402), an operator can select all of the necessary features to apply a tread (10) to a prepared tire casing (20). The control monitor (402) and its embedded software assist the operator to not only mount the proper tread (10) onto the proper casing (20), but to do so in a manner that insures that the tread (10) is properly centered at the time it is applied to the casing (20).

Extending from the front end (405) of the cabinet structure (400) is a tread expander assembly (200). The tread expander assembly (200) is designed to accept a circular or annular tread (10). The tread expander assembly (200) has a plurality of fingers (202) at spaced locations designed to contact the tread (10). The entire tread expander assembly (200) is radially movable along a fixed axis to open and close. Each tread expander finger (202) is radially expandable such that it can stretch the tread (10) to a diameter sufficiently large to enable the tread, while mounted on the fingers (202), to be expanded sufficient to enable the tread (10) to encircle the casing (20) upon which the tread (10) is to be applied.

Also extending from the front panel or end (405) is a mount wheel (300), which has an axis coincident with the axis of the tread expander assembly (200). The mount wheel (300) is movable linearly along an axis coincident with the axis of tread expander assembly (200) so that the mount wheel (300) can be retracted or extended relative to the cabinet structure (400).

Figure 2:
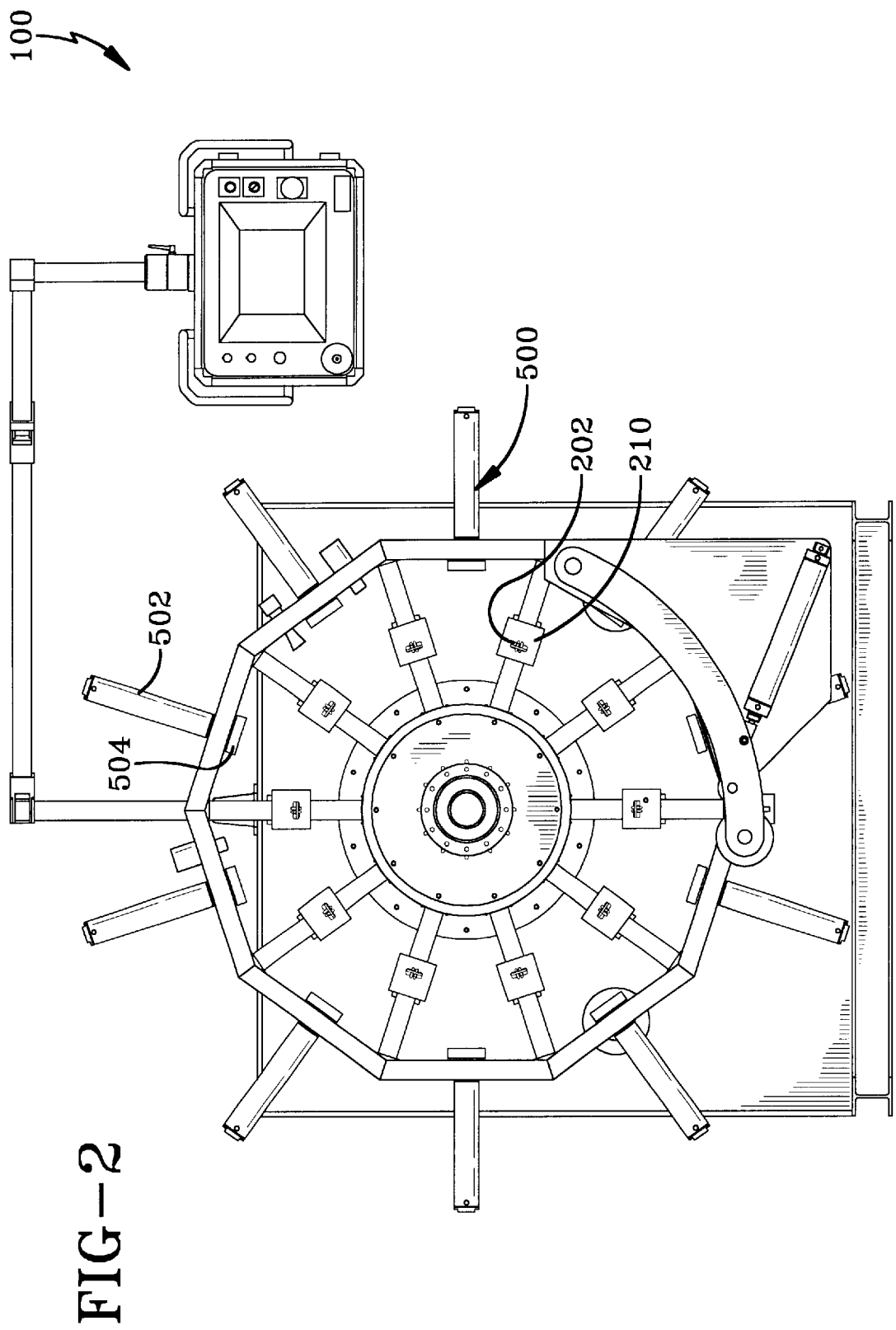
FIG. 2 is an end view of the apparatus of FIG. 1.

A clamping mechanism (500) as shown in FIG. 2 is positioned at a diameter superior to the tread expander fingers (202). At locations spaced approximately equal distance between pairs of the tread expander fingers (202) there is located a clamp (502) having a round pad (504) that comes in contact with the tread (10) and applies pressure locally against the tread (10) pushing the tread (10) onto the casing (20) and securing it there during the assembly (200).

With particular reference to FIG. 4, a cross-sectional view of the application apparatus (100) is shown. As shown, the mount wheel (300) is attached to a plate (302) welded to a slidable axle (304), the axle (304) is positioned and centered on a tapered roller bearing (305). This axle (304) mount wheel (300) and clamp (500) can be extended outwardly to a position shown in phantom lines. The axle (304) is centered internal of an outer housing (306), bolted to the outer housing at the flange (307) is a drive motor mechanism and attachment assembly (308). As shown, this entire assembly (308) traverses with the mount axles (304) and (306) as the mechanisms are extended and retracted. As illustrated, a bracket (309) extends from the aft end of the mount wheel axle (304). Connected to the bracket (309) is found a hydraulic cylinder (310). The hydraulic cylinder (310) is connected at the flange (311) to a cylindrical housing (312). The cylindrical housing (312) includes a plurality of gear drive mechanisms, the gear drive mechanisms being operated by a drive motor (314) which rotates the gear (315) to drive a plurality of gears (316), each gear (316) being connected to a shaft (317). Each shaft (317) is threaded and connected to a support (318), which is connected to one of the fingers (202) of the tread expander assembly (200). The shaft (318) supporting the finger includes two bearings (319), which are slidably attached over post (320) in two locations as illustrated for each finger (202) of the tread expander assembly (200).

As can be easily appreciated by one skilled in the art the mechanisms are connected in such a way that movements can be controlled independently or cooperatively linked. This is accomplished by means of systems included in the cabinet structure (400), all of which can be operated at the control monitor (402).

As one skilled in the art will easily appreciate the mechanical mechanisms for driving the tread expander assembly (200) and the case mount assembly (300) and the clamping mechanism (500) can all be accomplished through other alternative means, however, it is important that the mechanisms be sufficiently coupled that they can work in cooperative movement so that alignment can be achieved, most preferably automatically.

Figure 5:
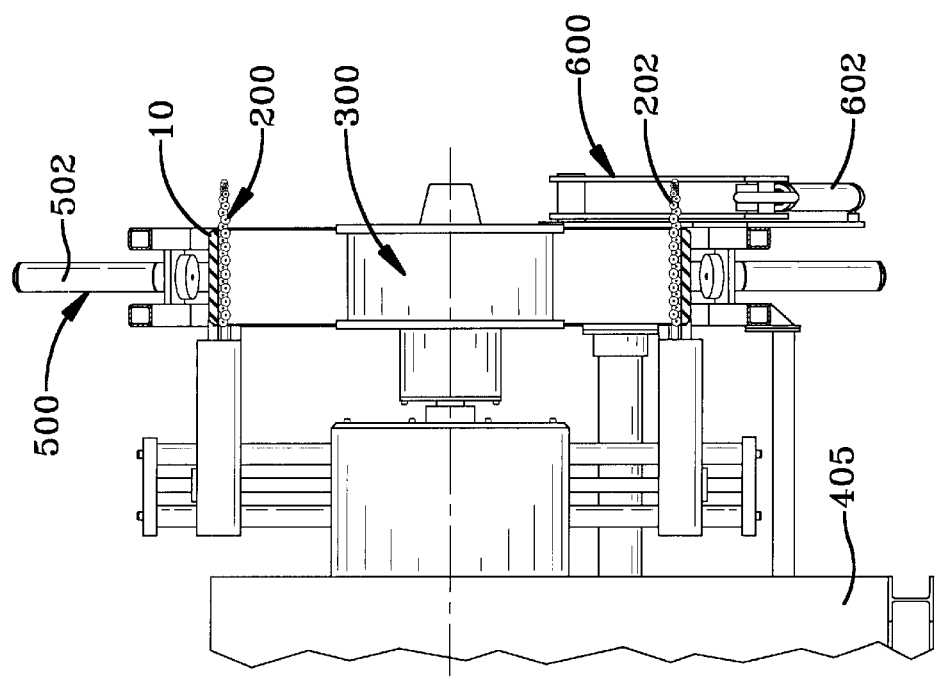
FIG. 5 is a partial plan view of the end of the apparatus depicting a cross-section of a tread mounted onto the tread expander assembly.
Figure 10:
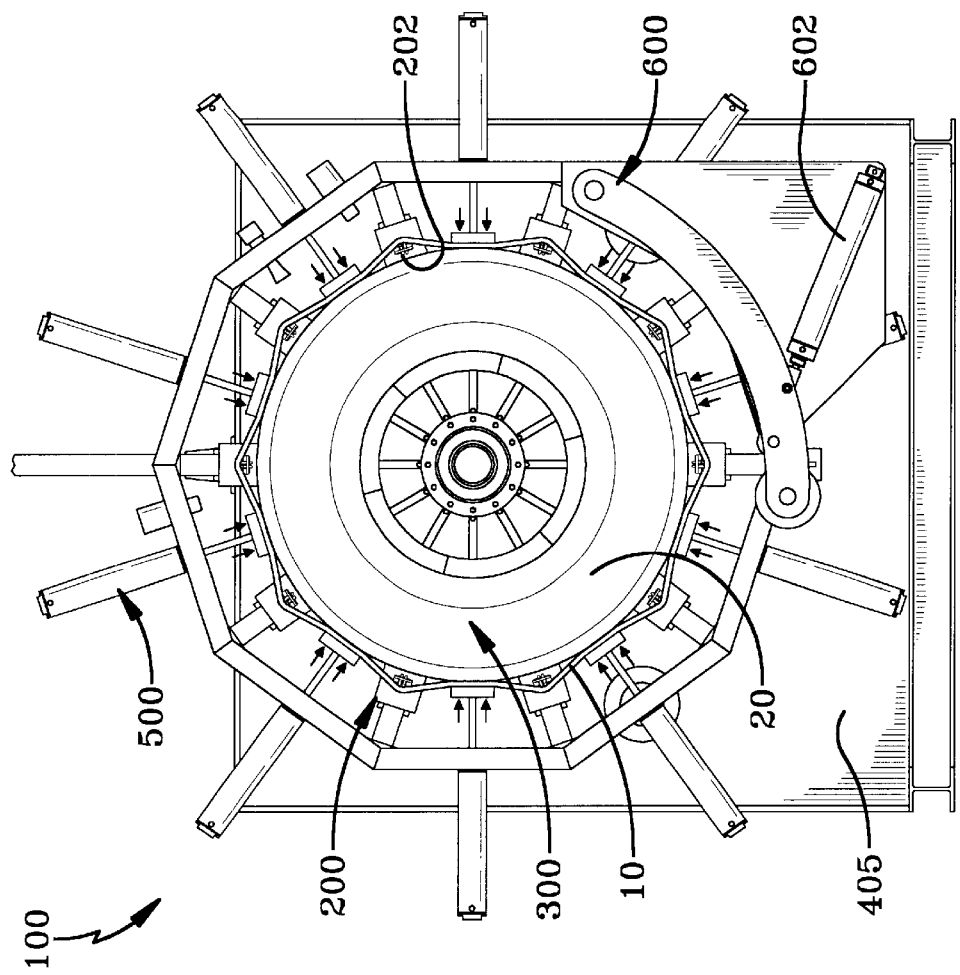
FIG. 10 is an end view showing the tread clamping mechanism securing the tread to the casing while the tread expander fingers are extended and lying between the tread and the casing.
Figure 9:
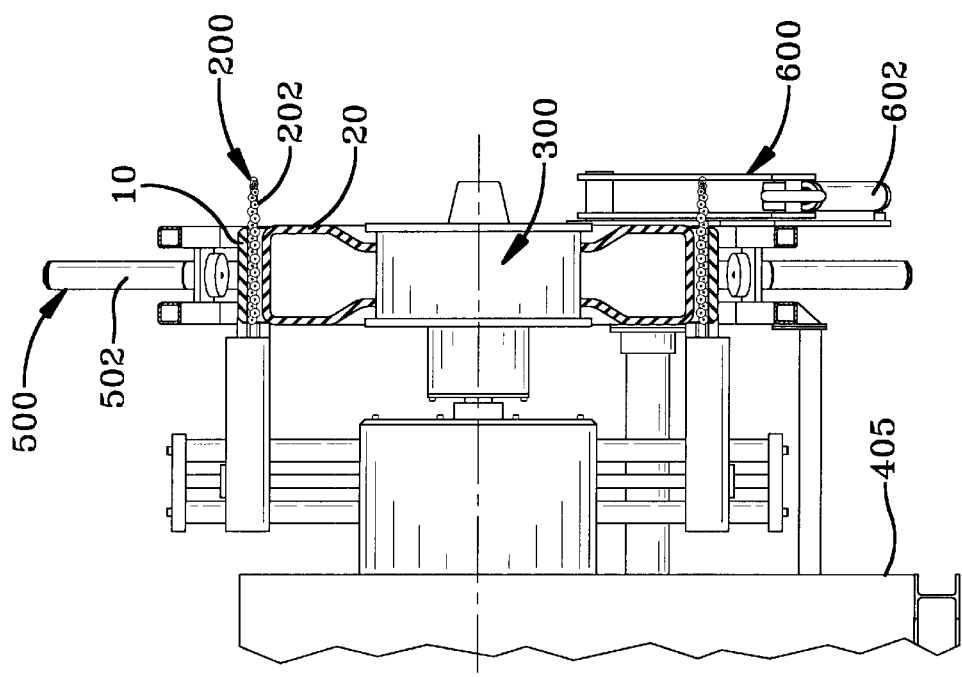
FIG. 9 shows a partial cross-sectional view of the tread on the tread expander being centered over the casing.

To facilitate an understanding of how a tread (10) is applied to a prepared casing (20), FIGS. 5 through 14 demonstrate in a rather systematic fashion how a tread (10) and tire casing (20) can be applied to the tread applicator (100). With reference to FIG. 5, an annular tread (10) is shown mounted onto the tread expander assembly (200). The tread (10) is positioned over the plurality of fingers (202) and is slid onto the assembly (200) until it contacts a stop mechanism (210). The stop mechanism (210) is linearly movable and as discussed later has a contour such that it insures the stop contacts an upper portion of the tread (10) along a tread shoulder (12). This insures that wing treads can be accommodated without interfering with the automated centering feature, which will be discussed later.

As shown, the mount wheel (300) is in a retracted position approximately centered with the tread expander assembly (200) during this operation. What would be readily appreciated is that the operator can mount the circular tread (10) over the tread expander assembly (200) while simultaneously being able to position the tread (10) from one end of the apparatus. In prior art mechanisms, these locations were separated such that an operator had to position himself between the tread expander assembly (200) and the casing (20) and would have to serpentine a circular tread between the mechanisms in order to accomplish this feat. By designing the piece of equipment as shown in FIG. 5, the operator can simply position the tread (10) onto the tread expander assembly (200) while not having to position himself between any other mechanism. This greatly enhances the ergonomics of the applications and facilitates the operator's ability to mount the tread (10) quickly and precisely.

Figure 6:
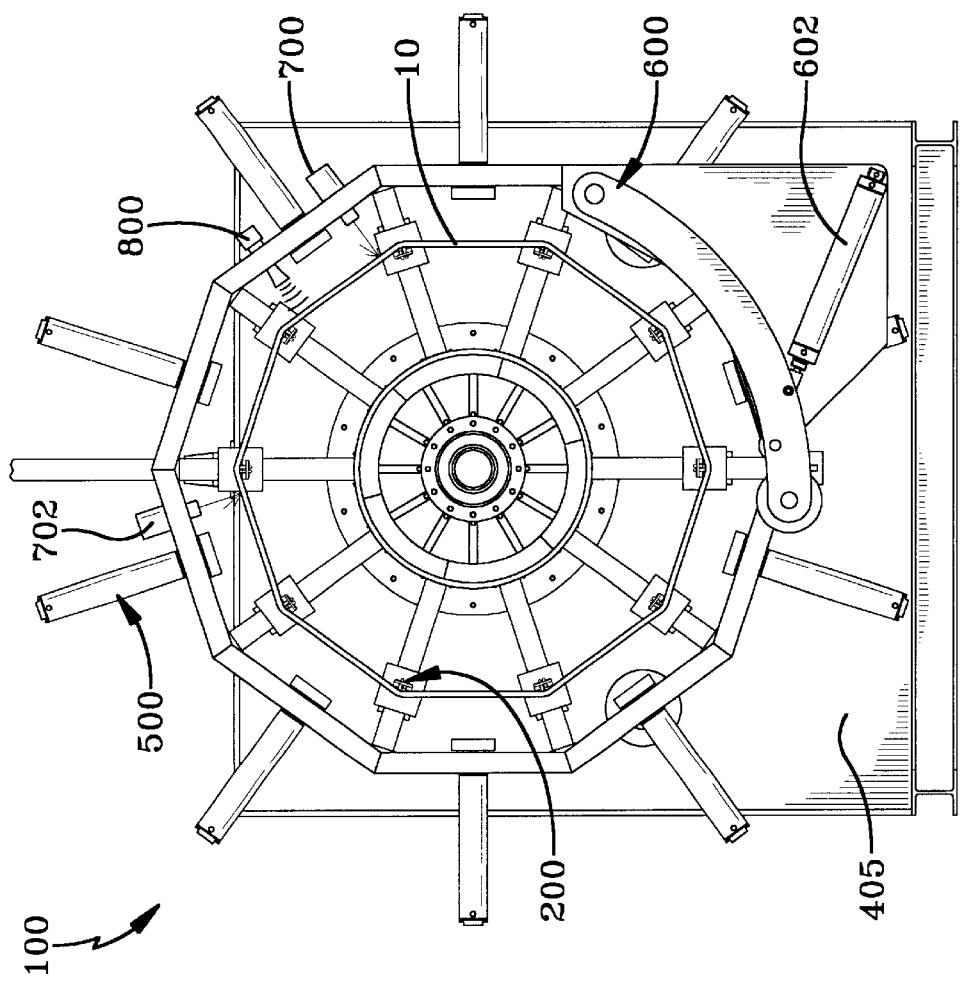
FIG. 6 is an end view of the tread mount on the tread expander assembly.

As shown in FIG. 6, the next operation is to have the tread expander assembly (200) extend to a position in a slightly expanded mode. This slightly tensions the tread (10) such that it is securely positioned on the tread expander (200). When this is accomplished because the tread expander assembly (200) has spaced locations for the fingers (202), the tread (10) takes on somewhat of a linear configuration between adjacent figures (202).

As the tread (10) is positioned into contact with the stop mechanism (210), a first tread edge and the second tread edge pass under the sensor (700), the sensor (700) indicates or signals the software and the software predicts the total width TW of the tread (10) and the apparatus internal computer calculates the distance to the centerline from the stop mechanism (210). The stop mechanism (210) is preferably designed to be axially movable such that at each location it automatically positions itself back to a tread contact point at each finger location. To insure contact of the tread at each stop mechanism (210), it is also desirable to have the stop mechanism (210) move slightly back, in other words, the operator pushes the tread (10) onto an overmount position and then the stop mechanism (210) moves the tread (10) back to a perfectly centered position at a known plane P coincident with the centerplane CP of the tread (10). This is important because this software enables the operator to simply place the tread (10) on the expander assembly (200) and the tread (10) will be automatically aligned and the exact center will be calculated each time for each tread (10) so that each tread (10) regardless of its axial width will be able to be centered precisely at the tread center.

Another feature that is useful is the operator can adjust for slight off center if he prefers to actually mount the tread (10) such that it is not precisely centered, but in a position that actually fits the contour of the casing (20) in a better fashion. In certain cases, this may be wherein the casing (20) was not precisely buffed such that the casing centerline is not in perfect alignment. This can occur occasionally due to manufacturing tolerances, however, this equipment is so precise it allows the operator to align the tread (10) precisely to the contour of the buffed casing (20) regardless of its position relative to the casing centerline. In such a case, the centerline of the casing (20) can be jogged to align with a centering laser beam mechanism (702).

Figure 19:
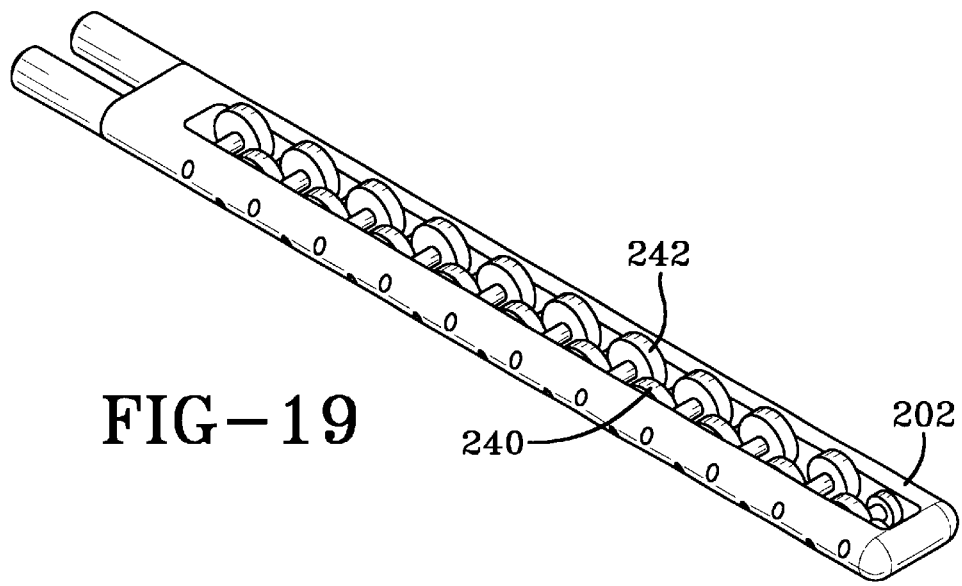
FIG. 19 is a perspective view of one of the tread expander fingers.
Figure 20:
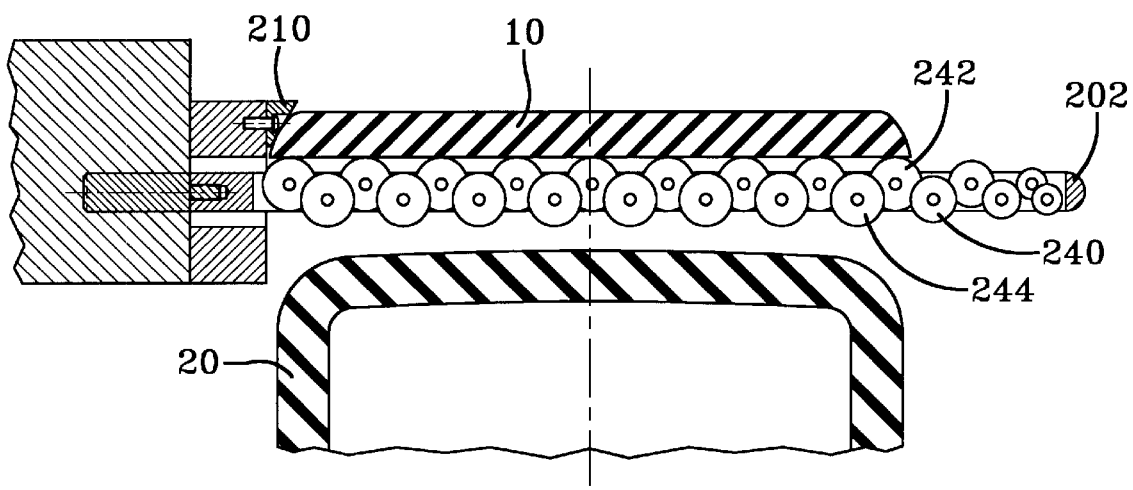
FIG. 20 shows a cross-section of the tread expander fingers with a tread shown centered around the casing.

In FIG. 7, once the tread (10) is centered the tread expander fingers (202) are stretched further to a position that will permit the tread expander fingers (202) to let the casing move under tread. As shown in FIG. 7, the casing wheel mount (300) has been extended such that the tire casing (20) can be mounted easily onto the wheel mount (300). Once mounted the casing (20) can be inflated on the wheel mount (300) prior to applying the tread (10). Shown in FIG. 8, the casing can be moved under or actual inside the annular tread (10), encircling the casing (20) as shown. In such a case, the fingers (202) retract close to but do not contact the outer surface of the casing (20), moving over the casing (20) and deliver the tread (10) to the proper location. As shown in FIGS. 19 and 20, each finger (202) has a plurality of wheels (240). Each wheel (240) is positioned such that there are two rows, an upper row (242) and a lower row (244), the wheels (240) progressively gets smaller as you reach the extreme end of the finger (202). This insures that as the tread (10) is clamped into position on the casing (20), the fingers (202) can easily be extracted as the wheels (240) get smaller as they are being pulled out from between the tread (10) and the casing (20). Prior to pulling the fingers (202) out, the clamps (502) between adjacent fingers (202) are extended until the clamp pads (504) contact the tread (10) against the casing (20) and to secure it in a lock-down position, then the fingers (202) are extracted from the tire assembly as shown in FIG. 11. The clamps (502) are shown in a retracted position.

In FIG. 12, the clamps (502) impact the tread (10) to the casing (20) at a plurality of locations as the casing (20) is rotated and indexed. This creates a tamping action further securing the tread (10) onto the casing (20).

Figures 13, 14:
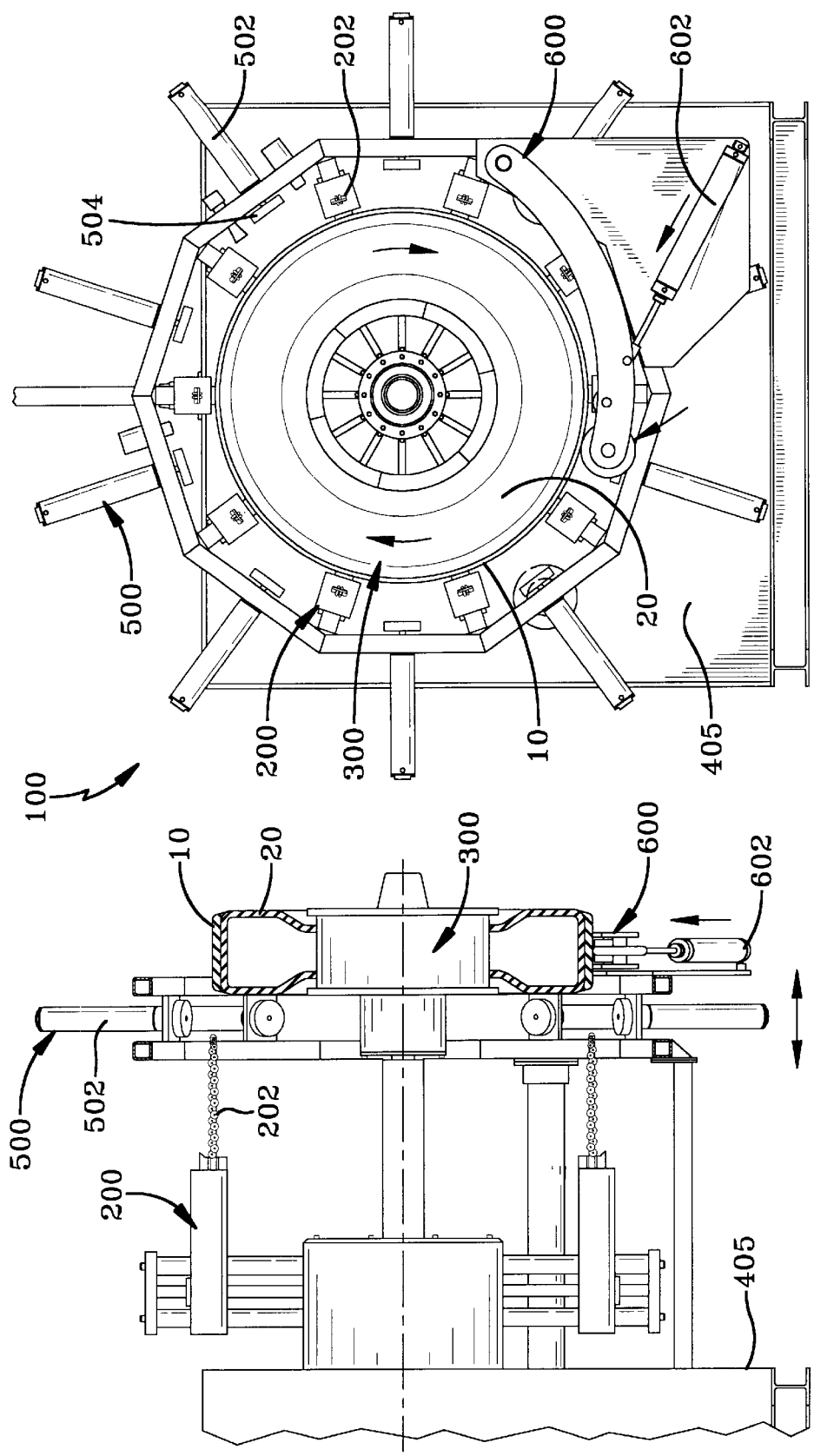
FIGS. 13 and 14 show views of a tread stitcher mechanism sticking the tread to the casing as the tread casing assembly is rotated.
Figure 15:
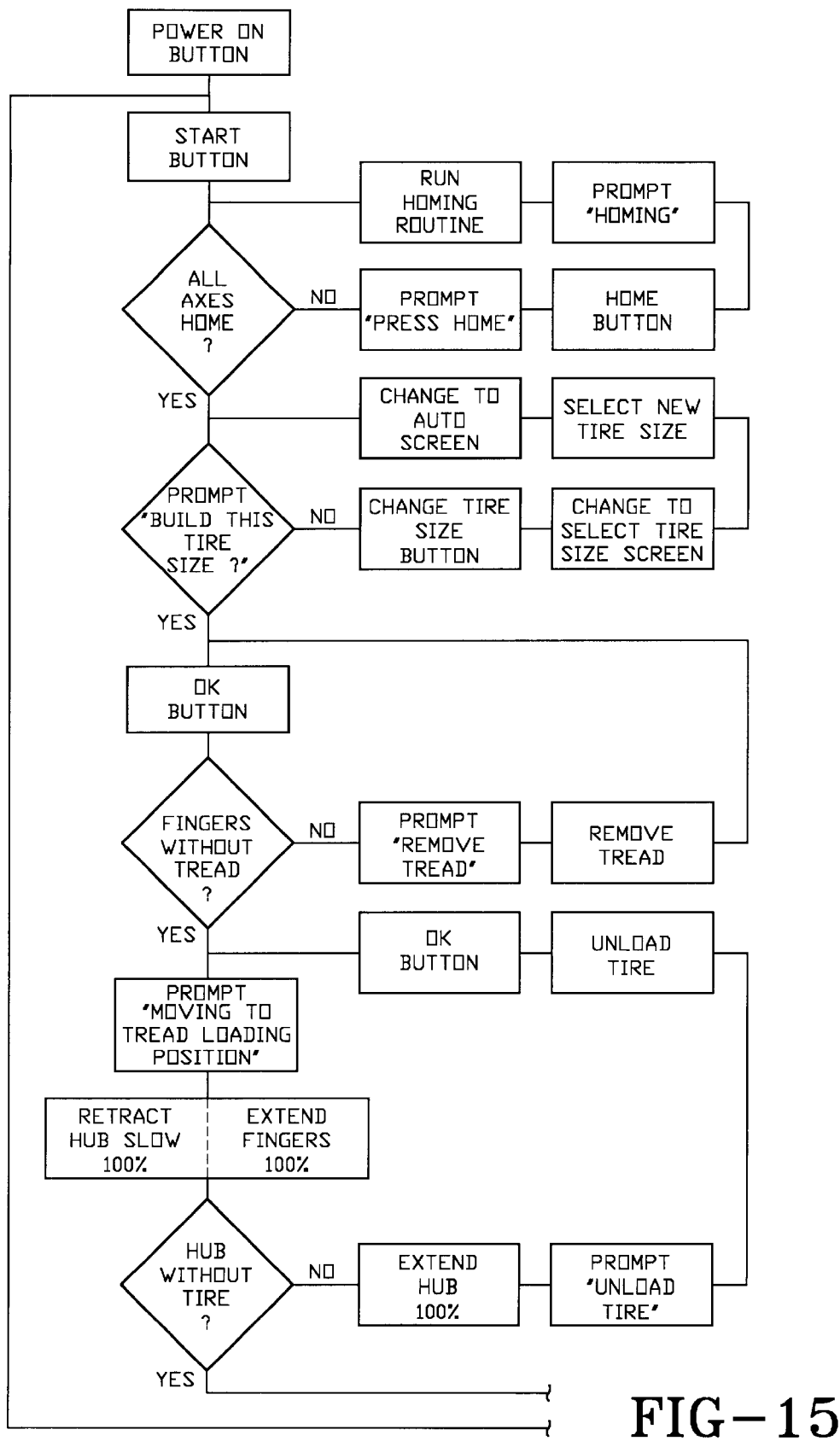
FIGS. 15, 16, 17 and 18 are a schematic diagram of the tread applicator sequence.
Figure 16:
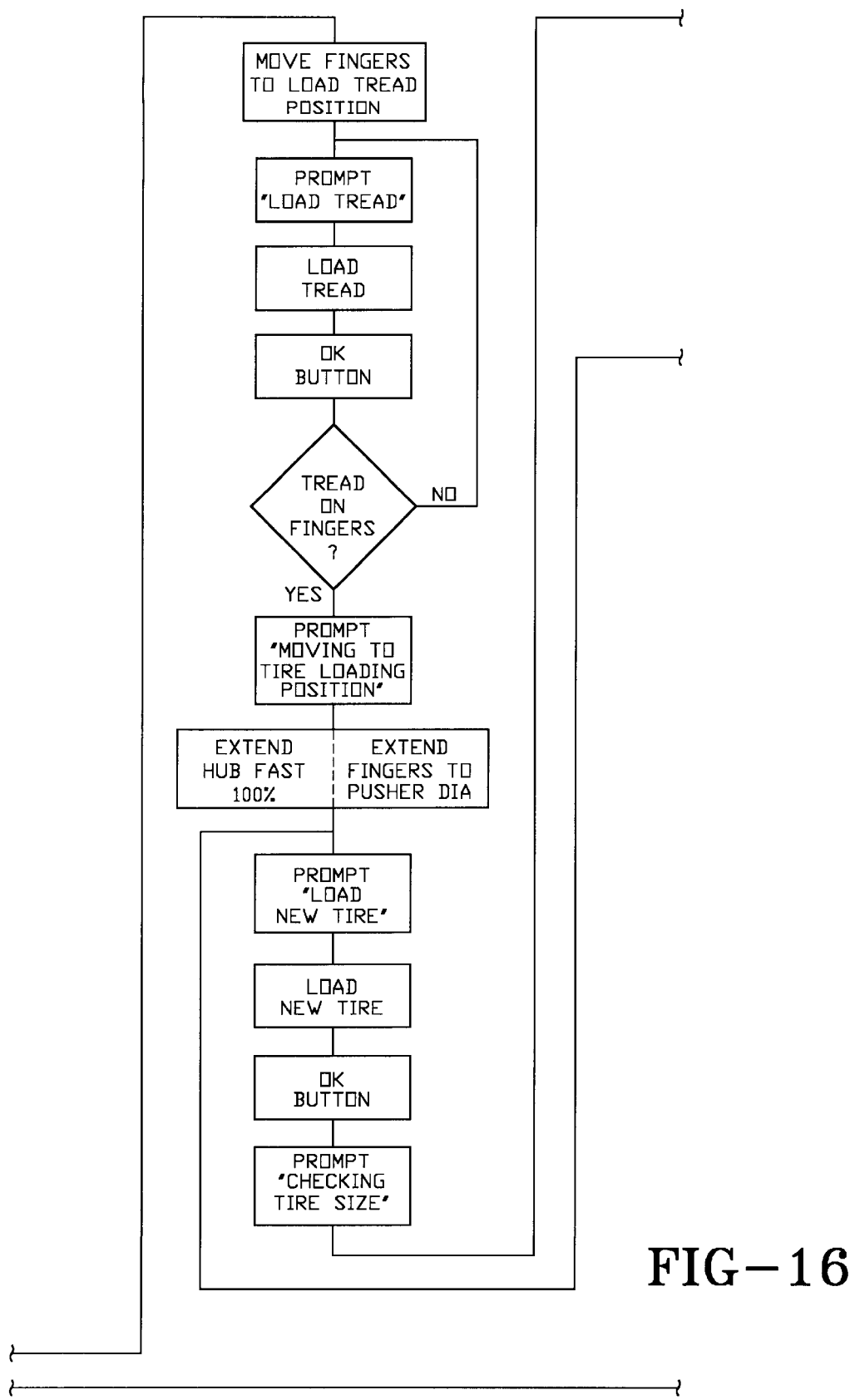
Figure 17:
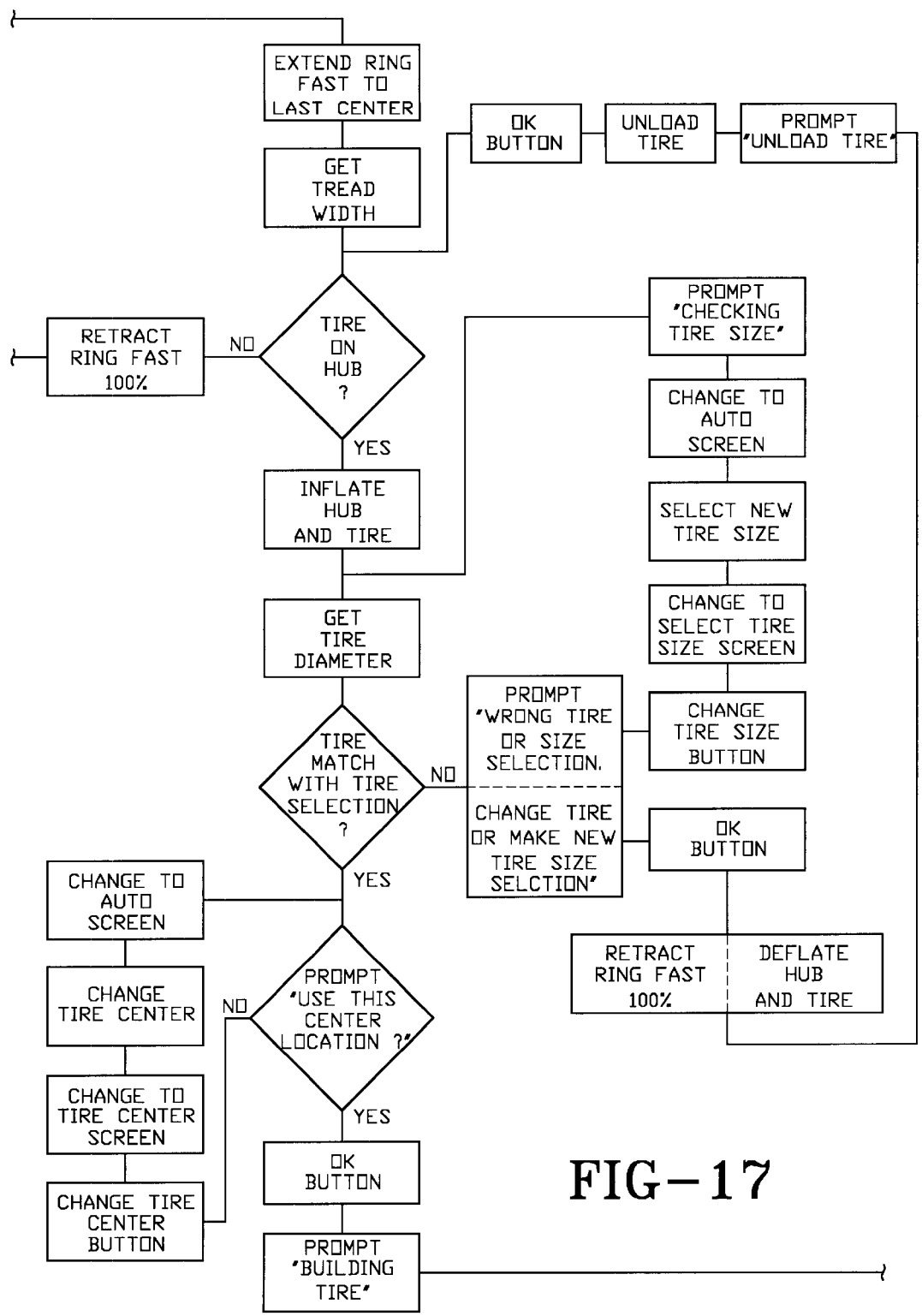
Figure 18:
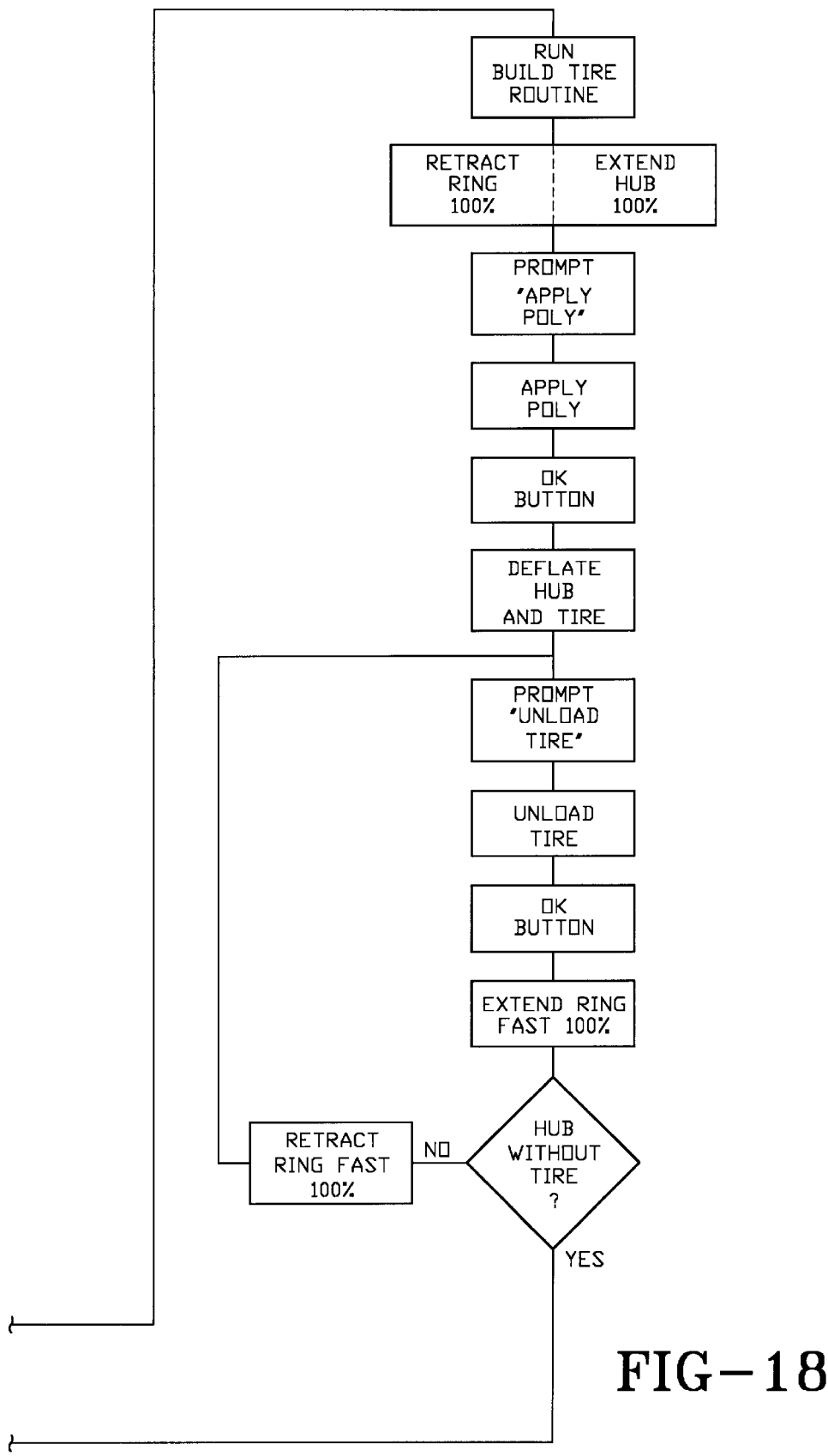

In FIG. 13, the clamping mechanism (50) is retracted slightly away from the assembled tread (10) and casing (20), at which point in time a pneumatic cylinder (602) is extended and a stitcher mechanism (600) comes into contact with the tread (10). As the casing (20) and tread (10) are rotated, this stitcher (600) further stitches the tread (10) to the casing (20) using the rollers (604) as illustrated in FIG. 14.

With reference to FIGS. 15, 16, 17 and 18, a diagrammatic and schematic sequence of the tread application method and process is shown wherein the software indicates certain activities which the mechanism (600 must go through in order to apply a tread (10) to the tire casing (20).

The software used in the present apparatus accommodates a variety of tire sizes. In order to simplify the mounting procedure certain features that were previously discussed in this application have more simplified or generic terms that are easier understand by the operator. For example, the apparatus (100) will be referred to a "machine". The monitor (402) will be referred to as "the main screen. In this reference what is actually happening is that the screen of the monitor displays a touch pad that prompts the tire builder to press a button on the screen indicating okay or not okay, or indicating what action he anticipates the machine to take next. The mount wheel (300) will be referred to as "the hub". The "ring" is a term used in the software that references to the clamping mechanism and the term "tire" is used when most often is referring to the tire casing (20) of a particular size tire. These term modifications are used again to facilitate the operator's ability to quickly prompt the screen.

The subsequent discussion is the sequence a tire builder would take following the procedures outlined in the software illustrated in the FIGS. 15, 16, 17 and 18.

When building the first tire, the operator powers up the machine and the machine will prompt the operator to press "home". The operator presses the "home" button and the machine will move all axis and display "Homing" on the screen. When the homing routine is complete, the machine will prompt "select tire size". The operator then presses the "change tire size" button to change to the tire size screen. He then presses the appropriate tire size selection button for the tire he is about to build. He then presses the "auto" button to return to the main screen. For all subsequent tires he is to build the machine will prompt "build new tire". The operator will then press the okay button on the screen. The machine will display the previous selected tire size and prompt, "build this tire size". If this is the correct tire size, he will press "okay". If it is not the correct tire size, he will press "change tire size" button and enter the correct tire size on the screen. The machine will display "moving to tread loading position". The fingers (202) will adjust to the proper tread loading position for the tire size selected, and the hub will retract to its tread loading position. The machine will prompt "load tread". The operator will load the appropriate tread (10) onto the fingers (202). He will then press "okay" when finished. The machine will display "moving to tire loading position", the hub will then extend to the tire loading position. The machine will prompt "loading tire". The operator will load the appropriate tire casing and press "okay" when finished.

The machine will display "checking tire". The ring, which we referred to earlier as the clamping mechanism (500) will extend and check to see that both a tread (10) and tire casing (20) are present. If both are present, the ring will retract and the expanded hub and tire will inflate. The way in which the ring or clamping mechanism (500) checks to see that the tread and casing are present provides the novel feature of having a sensor mechanism (700) that picks up the first tread edge (14) and a second tread edge (16) as the tread has been passed over by the clamping mechanism. It is preferable that the sensor (700) be a laser beam. Also attached to the clamping mechanism is a device (800) that emits a sonic signal to verify that a tire casing is actually on the mount wheel when the clamping ring passes over. If both the casing and the tire tread are present, the ring will retract and the expandable hub and tire will inflate. The machine will prompt "remove polyfilm". If no polyfilm is present the operator presses okay. If polyfilm is present, the operator removes the film using the foot pedal to rotate the hub as required. When he is finished, he prompts okay. At this point the ring will extend to the point when a line laser is positioned on the theoretical center of the tire. The machine will prompt "use this center location?". If this centerline is acceptable, the operator presses "okay". If the centerline needs to be adjusted, the operator will press the "change tire center" button. At this point in time, the machine jogs the ring and the line laser to the desired center location by pressing in or out buttons on the tire center screen. When the operator is satisfied with the centerline, he presses the enter button. He then presses okay on the main tire screen. The machine will display "building tire". The machine will complete the tire building cycle automatically unless interrupted by the stop button. When the tire is complete, the machine will prompt apply polyfilm. The operator will apply polyfilm and width to the tire using the hub foot pedal to rotate the hub as required. When finished he will press "okay". The machine will prompt "unload tire", at this point, the operator unloads the tire from the hub, presses "okay" when complete. The machine will then prompt "build a new tire" and display the last tire size loaded. The operator will press okay and the building sequence will start again.

As can easily be appreciated, the apparatus (100) takes much of the guesswork out of tire and tread application procedures when retreading commercial truck tires or any truck tire or any tire for that matter. What is of great benefit is that the operator is positioned at one location with a screen and in full view of the mechanism so that everything from the monitor display to all the actual tread application mechanisms can be easily observed by the operator without requiring the operator to be moved or to move from the front of the location of the apparatus.

In FIG. 20, what is readily appreciated is that the stop block mechanism (210) is shown contacting the edge 14 of the tread (10). This is important because the centering mechanisms rely on the fact that the tread (10) is mounted on the tread expander (200) and the stop block pushes the tread (10) back to a known center position. The center position is calculated by measuring the tread edges by sensing them using the sensor (700). Once the tread width TW is known, the software automatically calculates where the center is. Once the tread (10) pushes into contact against the stop block (210), then the stop blocks (210) move a predetermined distance to a fixed plane. This enables the optimal centering of the tread (10) to the casing (20). No other prior art apparatus has been built that automatically calculated the actual center of the tread (10) and then automatically positions the casing (20) to that location relative to the apparatus. This eliminates almost all-human error from entering into a tire assembly.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An improved method for applying an annular tread to a pneumatic tire casing, the improved method comprises the steps of:
    applying the annular tread and the casing from one end of an apparatus for applying the tread to the casing, including the steps of
    mounting the tread on a tread expander assembly, having a plurality of locations for supporting the tread, the tread expander assembly being radially expandable and having an axis along a line coincident with or parallel to an axis of a mount wheel for accepting a casing, and wherein the tread passes over the mount wheel prior to a casing being mounted onto the mount wheel;
    mounting the casing to the mount wheel; the mount which being movable along the line coincident or parallel to the axis of the tread expander and the mount wheel casing;
    expanding the tread and moving the casing; wherein the tread encircles the line coincident with or parallel to the axis of the tread expander assembly casing; and
    clamping the tread to the casing and transferring the tread onto the casing.

2. The improved method of claim 1 for applying an annular tread to a pneumatic tire casing wherein the step of mounting the tread on the tread expander includes the steps of pushing the tread a fixed distance along a first edge of the tread at each location of tread support, thereby aligning the annular tread parallel to the casing prior to expanding the tread to encircle the casing.

3. An improved method for centering an annular tread on a pneumatic tire casing having the steps of mounting the tread on a tread expander assembly; establishing a first plane coincident with the desired center of the casing or wheel, positioning the tread on the tread expander assembly and establishing the circumferential centerline of the tread to be coincident with a second plane axially spaced a relative distance from and parallel to the first plane of the casing or wheel; expanding the tread as required to permit the tread to encircle the casing; and providing relative axial movement between said tread expander and a casing mounted on said wheel to bring the second plane and the first plane into coincidence, the improved method characterized by:
    establishing the second plane by sensing a first edge and a second edge of the tread when the tread is positioned on the tread expander; communicating the sensor data to a computer which calculates the distance between the first and second tread edges to establish the tread centerline, the location of the second plane, and the relative distance between the first and second plane, and then directing the relative movement of the tread and casing to align the first and second planes.

4. The improved method for centering an annular tread on a pneumatic tire casing of claim 3 further characterized in that the step of positioning the tread includes the step of moving the tread into contact against one or more axially movable mechanical stops, each mechanical stop having a tread contacting surface equally spaced from the first plane, to move against the tread for a fixed distance, thereby aligning the tread edges parallel to the first plane.

* * * * *